United States Patent
Durr et al.

(10) Patent No.: US 7,191,436 B1
(45) Date of Patent: Mar. 13, 2007

(54) COMPUTER SYSTEM UTILITY FACILITATING DYNAMICALLY PROVIDING PROGRAM MODIFICATIONS FOR IDENTIFIED PROGRAMS

(75) Inventors: Philip G Durr, Redmond, WA (US); Donald J Munsil, Kirkland, WA (US); Mark P Derbecker, Seattle, WA (US); Lindsay W Steventon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 569 days.

(21) Appl. No.: 09/801,950

(22) Filed: Mar. 8, 2001

(51) Int. Cl.
*G06F 9/44* (2006.01)
*G06F 17/30* (2006.01)

(52) U.S. Cl. ............. 717/170; 717/169; 717/171; 707/5; 707/6

(58) Field of Classification Search ........ 717/168–178; 707/6, 203
See application file for complete search history.

(56) References Cited

U.S. PATENT DOCUMENTS

| | | | |
|---|---|---|---|
| 5,193,158 A | | 3/1993 | Kinney et al. |
| 5,619,716 A * | | 4/1997 | Nonaka et al. ............. 717/167 |
| 5,832,271 A | | 11/1998 | Devanbu |
| 5,983,267 A * | | 11/1999 | Shklar et al. ............. 709/217 |
| 6,122,639 A * | | 9/2000 | Babu et al. ............. 707/103 R |
| 6,185,556 B1 * | | 2/2001 | Snodgrass et al. ............. 707/3 |
| 6,199,063 B1 * | | 3/2001 | Colby et al. ................. 707/4 |
| 6,330,569 B1 * | | 12/2001 | Baisley et al. ............. 707/203 |
| 6,513,133 B1 | | 1/2003 | Campbell |
| 6,834,276 B1 * | | 12/2004 | Jensen et al. ................. 707/2 |
| 2003/0195974 A1 * | | 10/2003 | Ronning et al. |

OTHER PUBLICATIONS

U.S. Appl. No. 09/513,016, filed Feb. 25, 2000, Lupu et al.
U.S. Appl. No. 09/544,512, filed Apr. 6, 2000, Lupu et al.
U.S. Appl. No. 09/544,514, filed Apr. 6, 2000, Lupu.
U.S. Appl. No. 09/801,951, filed Mar. 8, 2001, Durr et al.
"Programming Applications Microsoft Windows," Fourth Edition, by Jeffrey Richter, pp. 794-800.
Intel Corporation, "Exceptions and Interrupts", *80386 Programmer's Reference Manual*, Chapter 9, pp. 9-1-9-21 (1986).

* cited by examiner

*Primary Examiner*—Chameli C. Das
*Assistant Examiner*—Chuck Kendall (57) ABSTRACT

A program modification database and method for identifying a candidate entry within the correction database for a particular executable program are disclosed. The program modification database provides a general depository of program changes, referred to herein as substitute program segments, and a set of executable program entries containing program matching criteria and corresponding program changes. The program modification database includes an index. Each entry in the index includes a piece of identifying information for a referenced, corresponding executable program entry. The program modification database architecture is applicable to any type of program segment information for modifying either instruction code or data values within a program. The types of information, within a program matching criteria, taken from an executable program file used to identify a corresponding executable program entry within the program modification database are selectable on an individual basis from an extensible set of executable program information types.

33 Claims, 5 Drawing Sheets

| 300 | Size |
|---|---|
| 302 | Checksum |
| 304 | Company_Name |
| 306 | Product_Name |
| 308 | Product_Version |
| 310 | File_Description |
| 312 | Bin_File_Version |
| 314 | Bin_Product_Version |
| 316 | ModuleType |
| 318 | VerFileDateHI |
| 320 | VerFileDateLO |
| 322 | VerFileOS |
| 324 | VerFileType |
| 326 | PECheckSum |
| 328 | FileVersion |
| 330 | OriginalFileName |
| 332 | InternalName |
| 334 | LegalCopyright |
| 336 | S16BitDescription |
| 338 | UpTo_Bin_Product_Version |
| 340 | PrevOSMajorVersion |
| 342 | PrevOSMinorVersion |
| 344 | PrevOSPlatformID |
| 346 | PrevOSBuildNo |
| 348 | ModTime |

FIG. 4

```
220 —<DATABASE>
    224 —<LIBRARY>
        228 —<INCLUDE MODULE="XXX.DLL"/>
        230 —<EXCLUDE MODULE="YYY.DLL"/>
        232 —<DLL NAME= "MyShim.dll">
            234 —<DESCRIPTION>
            236 —<EXCLUDE MODULE="FOO.DLL"/>
            238 —<INCLUDE MODULE="BAR.DLL"/>
            </DLL>
        240 —<PATCH NAME= "MyPatch">
            244 —<MATCH_BYTES MODULE="%EXE%" OFFSET="0x00083FE2">6a 01
                    56</MATCH_BYTES>
            246 —<WRITE_BYTES MODULE="%EXE%" OFFSET="0x00083FE2">EB
                    07</WRITE_BYTES>
        242 —</PATCH>
    226 —</LIBRARY>

248 —<APP NAME="AppName" VENDOR="BigISV">

254 —<HISTORY ALIAS="billg" DATE="01/02/2000">
                <DESCRIPTION>
                </DESCRIPTION>
        256 —</HISTORY>

252 —<EXE NAME="AUTORUN.EXE"
            260 —SIZE="12345"
            262 —CHECKSUM="0xDEADBEEF"
            264 —TIME="01/01/2001 01:01:01">

266 —<MATCHING_FILE NAME="..\WIN\MYMATCH.FOO"
                        SIZE="2468"
                        CHECKSUM="0xBEDEBEDE"/>
            270 —<DLL NAME= "MyShim.dll>
                274 —<EXCLUDE MODULE="FOO.DLL"/>
                276 —<INCLUDE MODULE="BOO.DLL"/>
            272 —</DLL>
        278 —</EXE>

280 —<EXE NAME="SETUP.EXE"
                SIZE="67890"
                CHECKSUM="0xFEEDBEAD"
                TIME="02/02/2002 02:02:02">

282 —<PATCH NAME="MyPatch"/>
            </EXE>
    250 —</APP>
222 —</DATABASE>
```

COMPUTER SYSTEM UTILITY FACILITATING DYNAMICALLY PROVIDING PROGRAM MODIFICATIONS FOR IDENTIFIED PROGRAMS

CROSS-REFERENCE TO RELATED APPLICATION

This application is related to co-pending application by Durr et al. U.S. patent application (serial number not yet assigned), filed Mar. 8, 2001, entitled: "A METHOD AND SYSTEM FOR DYNAMICALLY INSERTING MODIFICATIONS FOR IDENTIFIED PROGRAMS," that is explicitly incorporated herein by reference in its entirety, including any appendices and references therein.

AREA OF THE INVENTION

The present invention generally relates to executable computer program architectures. More particularly, the present invention relates to methods and systems for implementing computer program modifications. Such modifications replace or augment executable program instructions in existing computer programs (e.g., operating systems and executables) or data associated with computer programs to improve system operation and/or repair later-discovered defects. Even more particularly, the present invention relates to program modifications that are dynamically incorporated into a computer program (i.e., at the time an operating system loads a program for execution).

BACKGROUND OF THE INVENTION

Software developers occasionally discover minor errors in previously released programs. Furthermore, incompatibilities between an old program and a new operating system arise when a user updates an operating system. New computer hardware can also result in the discovery of errors in software designed to run on a previously existing hardware platform. Recalling entire programs can be very costly and impractical in cases where the error is relatively minor and/or the number of distributed programs is relatively large. In such instances downloadable software patches offer a practical tool for inserting replacement instructions or data enabling the software to operating properly.

Previously, if a software developer, user or other party identified an incompatibility between a computer program and the Microsoft Windows operating system, then the developer distributed a permanent patch (one that is actually stored in an updated version of the computer program) for insertion into the computer program to remedy the incompatibility. Software developers utilize permanent patches to remedy universal errors in a program (i.e., errors generally associated with all uses of the program). Such permanent patches must be compatible with other existing programs. Otherwise, the patch may create new errors requiring further patches.

A computer program must also permit changes to its original code to incorporate a permanent patch. A number of computer-based video games include anti-tampering mechanisms preventing changes to either the computer instructions or data. The anti-tampering mechanisms ensure proper use and operation of the programs, but they also prevent applying permanent software patches. Since a permanent patch necessitates changing a computer program's code, software with anti-tampering mechanisms are unlikely to allow even relatively minor permanent software patches. In such instances, installing a software patch requires disabling the anti-tampering mechanisms of a computer program. Thus, when faced with a need to make even minor changes to a tamper-protected program, developers either issue entire new copies of a program in an updated form or disable the anti-tampering mechanisms.

Certain program patches are incorporated into operating system application program interfaces (APIs) rather than the program itself. Anti-tampering mechanisms are unlikely to detect changes to the APIs. For example, many programs include a "get version" operating system command/API enabling applications to determine the version of an operating system installed upon a computer system upon which the applications execute. A computer program executing on a computer running a new version of an operating system will determine that the version of the operating system is unknown. The computer program registers an error condition and prevents further program execution. However, in many instances a computer program's operation is unaffected by changes present in the new operating system, and a simple incompatibility is eliminated by installing a patch in the API causing issuance of an expected (prior) version identification when the program executes the "get version" command. Such a fix does not require modifications to the computer program itself, and therefore anti-tampering safeguards are unaffected by the patch.

A potentially difficult task encountered when attempting to implement the aforementioned patch strategy involving API substitution is recognizing applications that need patches and then inserting and/or substituting the code at the required points of the application in a manner that does not interfere with the expected operation of the executable program. It is insufficient to merely create the intended patch. Some mechanism must be incorporated to allow a patch utility associated with the operating system, or other program controlling execution of an application, to identify the application as a candidate for incorporating patch code with virtually perfect accuracy. Even a single false positive identification by the patch utility is unacceptable. Lupu et al. U.S. application Ser. No. 09/513,016, filed on Feb. 25, 2000, entitled: "Fixing Incompatible Applications By Providing Stubs For APIs; and Lupu et al. U.S. application Ser. No. 09/544,512, filed on Apr. 6, 2000, entitled: "Fixing Incompatible Applications Using A Light Debugger," disclose a program modification system wherein modification candidate programs are identified within a general computer system registry. The registry is searched until a candidate executable program entry matching a selected executable program is located. In the case where an executable program does not have a corresponding patch stored on the computer system, the search mechanism traverses the registry until the absence of a corresponding entry is confirmed. If a matching entry is located in the general registry, then a corresponding hook DLL identified by the matching registry entry is read from a file located elsewhere in a computing system. The hook DLL in turn includes hook API structures that reference patch functions inserted in place of function calls within identified DLLs of the selected executable program.

SUMMARY OF THE INVENTION

The invention comprises a program modification database in the form of a file, or other data construct, including a set of substitute program segments and a set of executable program entries. The set of substitute program segments include program instructions/data for fixing and/or augmenting the operation of existing executable programs.

The set of program entries specify correction information for particular executable programs. Each individual entry within the set of executable program entries includes at least two information components. The first component comprises a program matching criteria. The contents of the program matching criteria are compared by a search/matching function to parameter values extracted from an executable program file to locate a matching program entry within the program modification database. The second component comprises a reference to at least one substitute program segment of the set of substitute program segments. The substitute program segments are provided in a variety of forms including functions, DLLs comprising APIs, in-memory patch bytes (of data or instruction code), etc.

The program modification database also includes an index of summary identification information for each of the program entries in the database. The index facilitates a tiered search methodology to quickly detect when a particular executable program is not represented in the set of specified program modifications thereby expediting a program loading process in instances where a particular executable program is not represented in the program modification database.

The present invention further comprises a method executed by a search function to determine whether a program entry exists within the set of specified program modifications corresponding to a program of interest (e.g., one that is presently selected for execution by a user for execution by an operating system).

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF AN
ILLUSTRATIVE EMBODIMENT

The need for a solution to the present problem of providing subsequently formulated modifications for widely released computer programs is addressed by the disclosed program modification database and method for identifying a candidate entry within the correction database for a particular application. The exemplary embodiment of the program modification database, disclosed herein, provides a general depository of program changes, referred to herein as substitute program segments, and a set of executable program entries containing program matching criteria and corresponding program changes.

The substitute program segments encompass a broad range of program substitution structures including, by way of example: (1) functions (e.g., APIs) provided via program modules (e.g., dynamically linked libraries (DLLs)), and (2) in-memory program patches. The substitute functions comprise executable code for performing a function. The in-memory program patches specify substitute byte data within a particular program. While the drawings and detailed description focus primarily upon executable program instructions and APIs, the program modification database architecture is applicable to any type of program segment information for modifying either instruction code or data values within a program.

The substitute program segments are referenced by executable program entries stored within the program modification database. Each executable program entry includes a program matching criteria. In an embodiment of the invention, the program matching criteria for each entry is customizable. The types of information from an executable program file used to identify a corresponding executable program entry within the program modification database are selectable on an individual basis. The types of information are selected from an extensible set of executable program information types.

In an embodiment of the invention, the program changes are incorporated into an executable program at the time the executable program is loaded by an operating system for execution upon a computer system. A method and system for identifying substitute program segment entries and incorporating the substitute program segments at the time a program is loaded for execution by an operating system is described in Durr et al. U.S. patent application (serial number not yet assigned), filed Mar. 8, 2001, entitled: "A METHOD AND SYSTEM FOR DYNAMICALLY INSERTING MODIFICATIONS FOR IDENTIFIED PROGRAMS," that is explicitly incorporated herein by reference in its entirety, including any appendices and references therein.

Figure 1:
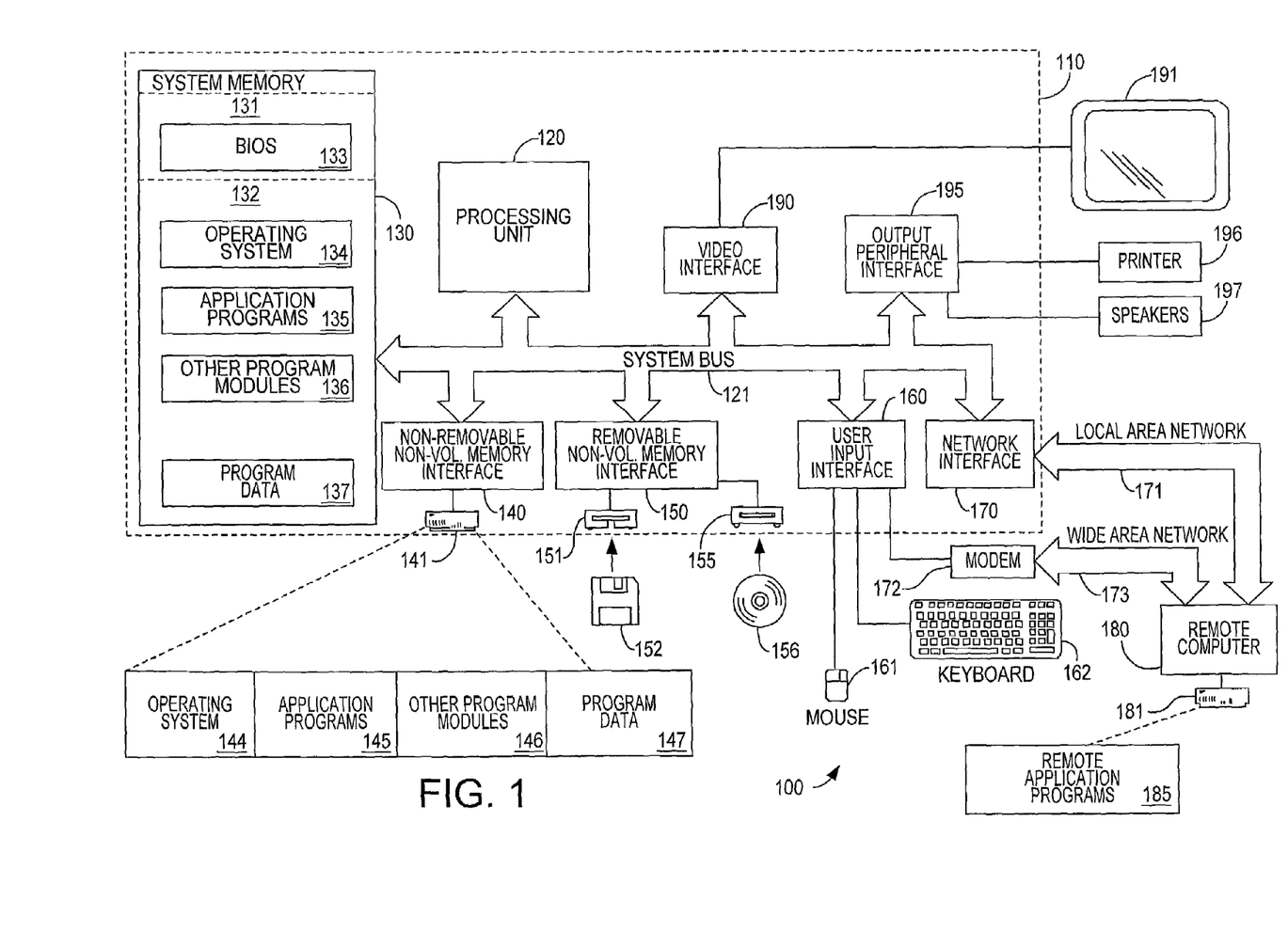
FIG. 1 is a schematic drawing illustratively depicting an exemplary operating environment for carrying out an embodiment of the present invention.

FIG. 1 illustratively depicts an example of a suitable operating environment 100 within which the invention may be implemented. More particularly, FIG. 1 illustratively depicts a computer system capable of incorporating and executing the functionality of the program modification database disclosed in detail herein below. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like, either alone or in combination.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, executable programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, executable programs 145, other program modules 146, and program data 147. Note that these components can either be the same as or different from operating system 134, executable programs 135, other program modules 136, and program data 137. Operating system 144, executable programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote executable programs 185 as residing on memory device 181. Those skilled in the are will appreciate that the network connections shown are exemplary and other means of establishing a communications link between the computers may be used.

Figure 2:
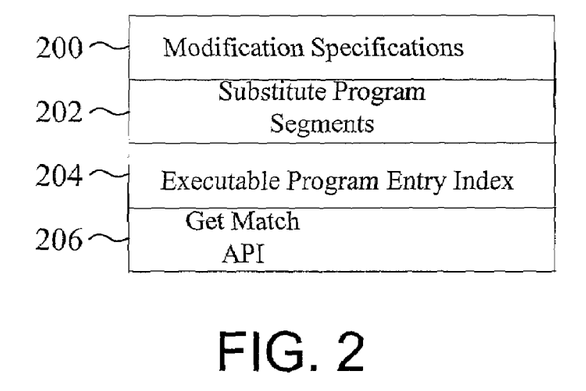
FIG. 2 is a schematic drawing depicting components of the program modification database embodying the present invention.

Having described exemplary computing environments in which the present invention is carried out, attention is directed to FIG. 2 that schematically depicts components of an illustrative embodiment of a program modification database in accordance with the present invention. In an embodiment of the invention, the program modification database components identified in FIG. 2 are stored within a single file. However, in alternative embodiments, one or more of the program modification database components described herein below are stored within separate files. The program modification database components are, by way of example, stored within a read-only access file to prevent modification by unauthorized or unknowledgeable parties. Though depicted as distinct in FIG. 2, the individually identified components of the program modification database are not necessarily physically separate.

Modification specifications 200, described in greater detail below with reference to FIG. 3, include a set of executable program entries corresponding to programs for which modifications are specified in the database. Each executable program entry includes a program matching criteria and one or more references to substitute program segments. The program matching criteria comprises, by way of example, a set of designated tagged/typed values for a particular executable. In an embodiment of the invention, each program matching criteria is created from executable program file information corresponding to selected ones of an extensible set of potential types of program file information supported by the program modification database. An exemplary set of program file information types is provided in FIG. 4 described herein below. A particular matching criteria for an executable program entry is, by way of example, a customized set of values of selected file information types that, in combination, uniquely identify a program.

In an embodiment of the present invention, references to substitute program segments within the executable program entries are "indirect references." Indirect references include for example: names, pointers or any other identification mechanism for locating a substitute program segment. In the illustrative embodiment of the present invention, the indirect references comprise names that identify DLLs within substitute program segments 202 maintained as a distinct component of the program modification database that in turn contain/reference a set of substitute functions. However, in an alternative embodiment of the invention, "direct references" to substitute program segments comprise actual substitute program segments (e.g., DLLs and/or the contents thereof) stored within the individual executable program entries. Storing indirect references within the executable program entries enables an individual program segment to be referenced by multiple executable program entries. In cases where a large number of distinct applications require a particular substitute program segment (e.g., API), indirect references substantially reduce the size of the program modification database.

In an embodiment of the present invention, an executable program entry index 204 contains entries having at least one piece of information identifying an executable program for which a corresponding executable program entry exists in the modification specifications 200. By way of example, an entry within the executable program entry index 204 includes a set of bytes corresponding to at least a portion of a program name. More specifically, each entry in the executable program entry index 204 contains a set number of bytes (e.g., 8 bytes) corresponding to a program name, or the first portion of the file name in the event that the file name exceeds the number of bytes for a single index entry. By specifying a fixed number of bytes per entry, the executable program entry index 204 is maintained in the form of a packed data structure that is easily traversed in view of the consistent index entry size. Alternatively, the index 204 comprises any of a number of different types of information relating to executable program files, and/or a non-packed/variable length data structure is utilized to carry out the index 204. In addition to the identifying information, each index entry also includes a second field referring to an executable program entry within the modification specifications 200. The index 204, in an embodiment of the present invention, is created from a compiled XML definition of the modification database (see, e.g., FIG. 3) and stored within the file containing the components identified in FIG. 2.

The index 204 facilitates relatively fast determination of potential candidate entries in the modification specifications 200. After applying a program name to the index entries, the resulting set of remaining candidate entries is likely to be very small, and the small resulting set is compared to additional program information to identify an existing matching entry within the modification specifications 200. Since most programs will not require program segment substitution, the index 204 generally reduces delays in determining that a particular executable program is not represented in the modification specifications 200. Furthermore, by narrowing the search of the modification specifications 200 for a completely matching entry, the index 204 generally facilitates reducing search times for locating matching entries in the event that an entry exists in the modification specification file corresponding to a loaded program. Retrieval of relevant information from the modification specifications 200 is limited to the relatively small number of candidate executable program entries identified from a search of the index 204 entries, and the number of actual pages of data retrieved from secondary memory into RAM to complete the search is generally reduced.

A get match API 206 executes a sequence of functions to identify an entry within the modification specifications in accordance with a set of steps summarized in FIGS. 5 and 5a described herein below. In general, the get match API 206 initially searches the index 204 to identify potential executable program entries in the modification specifications 200. Thereafter, characteristics of an executable program file are compared to the matching criteria of each potential executable program entry in the modification specifications 200 to identify a match.

Figure 3:
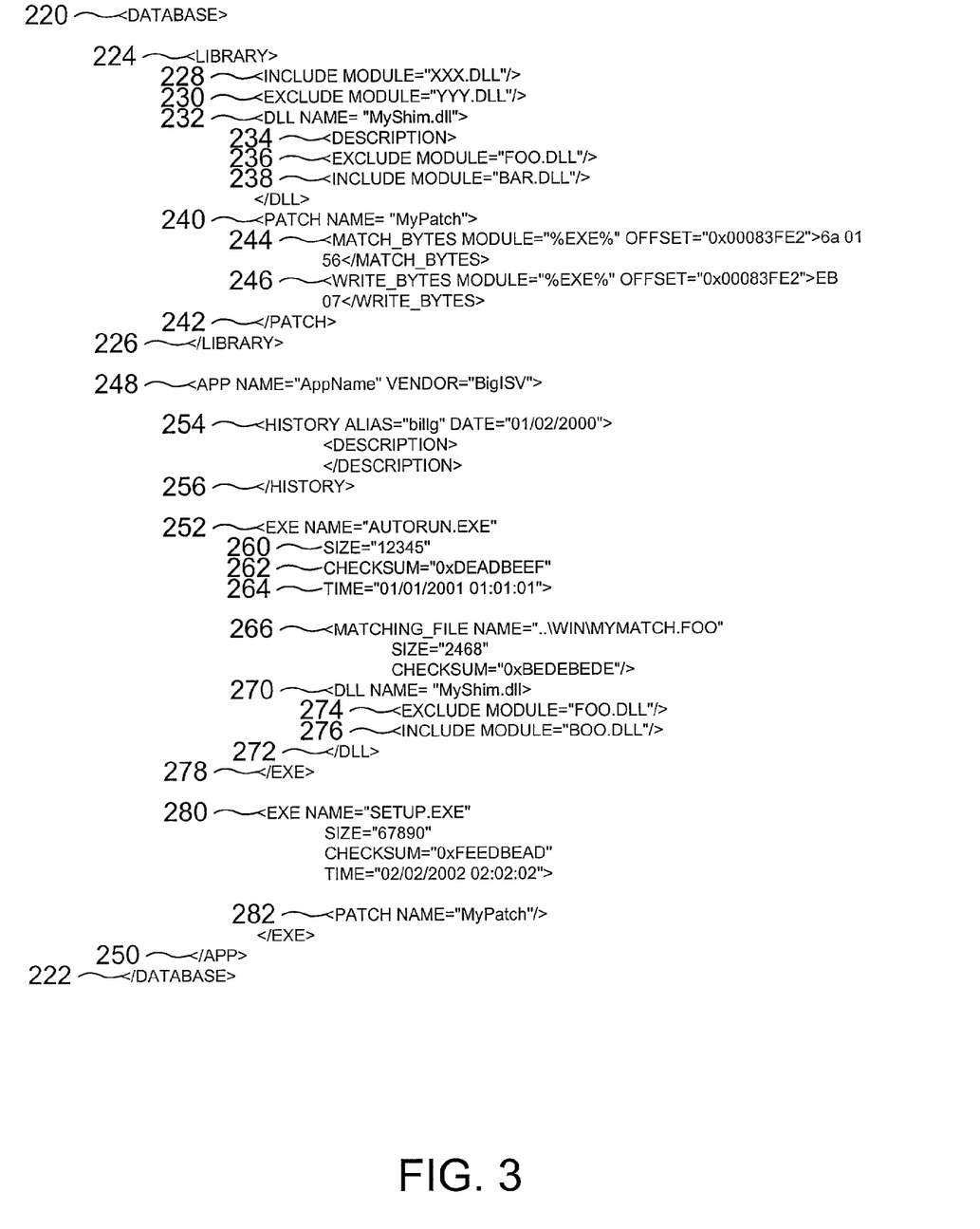
FIG. 3 is an exemplary (XML) definition for a file structure containing a program segment substitution library and executable program entries for the program modification database.

Turning now to FIG. 3, an exemplary format is provided for the modification specifications 200. In the illustrative embodiment of the present invention, the modification specifications 200 comprise XML tagged data arranged according to certain basic formatting rules. In alternative embodiments of the invention, the modification specifications 200 identify executable programs and related program segment substitutions using other names and/or formats. The modification specifications 200 include a set of tagged data fields. Those skilled in the art will readily appreciate that the choice of tag names is a matter of design choice. Furthermore, the content and form of the tagged fields for the modification specifications 200 is exemplary and is modified in alternative embodiments of the present invention.

While not depicted in FIG. 3, the modification specifications 200 begin with an XML version declaration tag (e.g., <?xml version="1.0"?>). The XML version tag resides at the beginning of the file containing the modification specifications 200 and enables the file to be recognized as an XML file. A <DATABASE> tag 220 and a </DATABASE> tag 222 bracket the substantive portions of the modification specifications 200.

After the <DATABASE> tag 220, a <LIBRARY> tag 224 and a </LIBRARY> tag 226 delimit a library section that specifies, by name, hook DLLs and patch PATCH files as well as INCLUDE and EXCLUDE declarations. The library section comprises any number (including none) of the aforementioned INCLUDE, EXCLUDE, DLL and PATCH entries, and the entries reside in any order within the library section. However, in an embodiment of the present invention, the INCLUDE and EXCLUDE entries precede the DLL entries (which may themselves have INCLUDE and EXCLUDE entries), and the PATCH entries are placed last in the library section.

An INCLUDE tag 228 or an EXCLUDE tag 230 has one required attribute, MODULE. The MODULE attribute specifies a module whose calls should be globally included or excluded from program modification. The INCLUDE tag 228 or the EXCLUDE tag 230 is overridden by a more particularized EXCLUDE/INCLUDE tag associated with a particular application/executable entry or DLL entry. Thus, an EXCLUDE/INCLUDE declaration in the library section, while global in scope with regard to the modification specifications 200, has the lowest priority in determining precedence of EXCLUDE/INCLUDE declarations applicable to a particular executable program. In an embodiment of the present invention, the global list of EXCLUDE/INCLUDE declarations only contains EXCLUDE entries that refer to operating system DLLs. Single-API excludes are placed in more specific portions of the modification specification file (e.g., under a DLL tagged section). EXCLUDE/INCLUDE precedence is discussed further herein below with reference to a portion of the database section delimited by an <EXE> tag 252 and an </EXE> tag 258. By way of example, an <INCLUDE> or <EXCLUDE> tag is terminated with a "/>" combination of characters. The following are examples of EXCLUDE and INCLUDE tags:

```
<EXCLUDE MODULE="FOO.DLL"/>
<INCLUDE MODULE="BOO.DLL"/>
```

A DLL tag 232 has one required attribute, NAME. The NAME attribute specifies a filename of a DLL included in the library. A DLL tag in the scope of the LIBRARY section names a dynamically linked library that is included within the database when the XML definition is compiled. In an embodiment of the invention, the DLLs and all other substitute program segments 202 are stored within a same file as the modification specifications 200. Including the substitute program segments 202, including DLLs, which are typically not very large, within a single file that also contains the modification specifications 200 allows client computer systems to be updated easily because all of the necessary components to fix an executable program are contained with a single database file. The single database file is, by way of example, shipped with the operating system and/or downloaded in the form of an operating system update. In alternative embodiments of the invention, the substitute program segments 202 are stored in one or more files distinct from a file containing the modification specifications 200.

A DLL tag requires a terminating </DLL> tag and optionally includes a number of additional tags. Examples of additional tagged fields under a DLL tag are a description under a <DESCRIPTION> tag 234 (terminated by </DESCRIPTION>, and include and exclude declarations such as an EXCLUDE tag 236 and an INCLUDE tag 238. The following is an example of a DLL entry for the modification specifications 200.

```
<DLL NAME="MyShim.dll">
    <DESCRIPTION>
        (This is the description of the MyShim dll)
    </DESCRIPTION>
    <EXCLUDE MODULE="FOO.DLL"/>
    <INCLUDE MODULE="BAR.DLL"/>
</DLL>
```

In the illustrative embodiment of the modification specifications 200, a patch entry is delimited by a <PATCH> tag 240 and </PATCH> tag 242. The <PATCH> tag 240 includes one required attribute, NAME. The <PATCH> tag 240 specifies the name of the PATCH as it will be referenced outside the library. The PATCH entry also includes a specification of the bytes that need to be located in the named dll within a <MATCH_BYTES MODULE> tag 244. The PATCH entry also includes a specification of the byte that will replace the located bytes. The replacement bytes are provided in a <WRITE_BYTES MODULE> tag 246. The following is an example of a PATCH entry within a file containing modification specifications 200.

```
<PATCH NAME="MyPatch">
    <DESCRIPTION>
        This is the description of the MyPatch patch
    </DESCRIPTION>
    <MATCH_BYTES MODULE="%EXE%" OFFSET=
    "0x00083FE2">6a 01
        56</MATCH_BYTES>
    <WRITE_BYTES MODULE="%EXE%" OFFSET=
    "0x00083FE2">EB
        07</WRITE_BYTES>
</PATCH>
```

A patch is executed by matching bytes in memory with the specified MATCH_BYTES to ensure that what resides in memory is what you expect and then overwriting the matched bytes with bytes specified by the <WRITE_BYTES MODULE> tag 246. All bytes are specified as two-digit hex. Offsets are relative to the base address of the module specified by the MODULE attribute. % EXE % is an alias for the main executable module.

An <APP> tag 248 identifying a particular program name is optional and is not used to locate a match in an embodiment of the present invention. In the exemplary embodiment of the present invention, an <EXE> tag 252 is placed within a portion of the modification specifications 200 delimited by the <APP> tag 248 and </APP> tag 250. However, in other instances of the modification specifications 200, the <EXE> tag 252 is placed under the <DATABASE> tag 220. However, the <APP> tag 248 is a useful way of tying together all the executables associated with a software application product, including perhaps the installer, the main application executable program, and various tools or subsidiary executables.

A portion of the modification specifications 200 delimited by the <APP> tag 248 and </APP> tag 250 contains one or more <EXE> tags. The <APP> tag 248 includes a NAME attribute and a VENDOR attribute. A history entry within an APP entry is delimited by a <HISTORY> tag 254 and a </HISTORY> tag 256. The portion of the APP entry within the history delimiter tags 254 and 256 is a comment field that records creators and/or modifiers of an executable program modification and a summary of the modification(s). The history entry, if properly maintained, informs a program manager of an executable program problem and changes to other software (e.g., an operating system) that created the problem. In cases where generic modifications (also referred to herein as "shims") are applied (e.g. version lying, 2 GB free space problem), it is sufficient to list the problem, and the reader can refer to the description of the substitute program segment as it is found in the library.

The <EXE> tag 252 is a special default "matching" tag for an executable program entry in the program modification database. The <EXE> tag 252 identifies a specific executable that needs to be modified (e.g., shimmed or patched), and specifies the modules (e.g., DLLs specifying hook API/substitute functions for hooked functions) or patches to apply to the executable. The portion of the modification specifications 200 delimited by the <EXE> tag 252 and </EXE> tag 258 contains any number of optional <MATCHING_FILE> tags, <DLL> tags, and/or <PATCH> tags.

The <EXE> tag 252 has one required matching criteria parameter, NAME. It is however contemplated that a number of additional matching criteria are specified to ensure that a particular executable entry within the program modifications 200 corresponds to a particular executable that is to be modified. In the exemplary embodiment of the present invention, the <EXE> tag 252 includes three optional matching parameters, SIZE 260, CHECKSUM 262, and TIME 264. Each of these parameters is used to verify the applicability of an designated executable modification to a subject program. SIZE is the size of the executable in bytes. CHECKSUM is a calculated checksum determined for the subject program. TIME is a human-readable creation time of the subject program, in UTC (GMT), in the form MM/DD/YYYY HH:MM:SS. These parameters comprise an exemplary portion of a matching criteria for a program entry. Other exemplary matching criteria tags and their corresponding descriptions are discussed herein below with reference to FIG. 4.

The <EXE> tag 252 is a default "matching_file" tag that is included in each executable program entry in the program modification database. A <MATCHING_FILE> tag 266 is an optional matching file tag that, like the <EXE> tag 252 is capable of having any of a number of matching parameter types and their corresponding values specified. The <MATCHING_FILE> tag 266 facilitates checking other files near the executable to ensure a valid match (i.e., guard against potential false positives). The files are first checked relative to the executable's directory and then in the current working directory (the directory within which the parent process resides—if there is a parent process). For example, if the "SETUP.EXE" program on the CD-Rom root directory E:\ unpacks an installer into C:\WINNT\TEMP\, then executes the installer, a database matching system will check for matching files in (or relative to) both C:\WINNT\TEMP\ and E:\. By way of example the matching file name contains a relative path. However, the matching file name does not contain a drive designator because the target machine may assign different letters to relevant drives. The <MATCHING_FILE> tag 266 is terminated by "/>" in an exemplary embodiment of the present invention.

In the scope of the <EXE> tag 252, a <DLL> tag 270 names a DLL that should be applied to identified EXE. The identified DLL includes substitute program segments (e.g., APIs) to be unpacked and incorporated into an executable that meets the matching criteria specified at least in part by the <EXE> tag 252. A </DLL> tag 272 terminates the DLL entry. The DLL identified within the tagged DLL entry is declared in the <LIBRARY> section of the modification specifications 200. While not included in the illustrative XML definition of FIG. 3, a DLL tagged entry includes an optional command line enabling a DLL entry for a particular executable program to specify options modifying the behavior of the DLL for the particular executable program such as activating options and applying particular fixes. This enables a single DLL declared above in the Library section of the XML definition to be used in different ways by executable programs without having to store multiple copies of the DLL in the modification database. The following is an example of an EXE entry having a DLL tagged entry including a command line.

```
<EXE NAME="setup.exe" ID="{46F3E4DE-B668-46EC-B9B8-
2D05891300F7}">
    <MATCHING_FILE NAME="Bingo.bmp"/>
    <MATCHING_FILE NAME="premium.hlp"/>
    <DLL NAME="CorrectFilePaths.dll" COMMAND_LINE="-f -s -p
winhelp;winhlp32"/>
  </EXE>
```

Optional <EXCLUDE> tag 274 and <INCLUDE> tag 276 are inserted between the <DLL>and </DLL> tags 270 and 272. Though not depicted in the exemplary XML description, INCLUDE and EXCLUDE policy statements are includable within the scope of an <EXE> tag outside the scope of any particular <DLL> tagged entry. The order of precedence for INCLUDE and EXCLUDE policy statements is in reverse of their appearance in the file. A substitute program segment loader system walks the list in reverse order and the first INCLUDE or EXCLUDE that matches on all provided attributes determines whether the modification is excluded or included. For this reason, it is important to order INCLUDES and EXCLUDES within the modification specifications 200 from generic to specific to ensure that specific are encountered first. The EXE entry is terminated by an </EXE> tag 278.

In the scope of an <EXE> tag 280, a <PATCH/> tag 282 names a patch file declared above in the <LIBRARY> section. The above-described <INCLUDE> and <EXCLUDE> tags are not valid for <PATCH> tags, and the PATCH is applied to the applicable program once at load time and can't be turned off and on via include/exclude statements.

The following is an example of a file portion delimited by the <APP> tag 248 and </APP> tag 250.

```
<APP NAME="AppName" VENDOR="BigISV">
   <HISTORY ALIAS="billg" DATE="01/02/2000">
      <DESCRIPTION>
      - Windows 95 version lying.
      - 2 GB disk free space problem.
      - App was putting its start menu items in the user-specific folder, but
      uninstalling them from the common folder. It was shimmed so that it
      installs its items to the common folder.
      </DESCRIPTION>
   </HISTORY>
   <HISTORY ALIAS="steveb" DATE="02/13/2000">
      <DESCRIPTION>
         App wasn't getting focus in certain startup scenarios.
         Forced SetWindowForeground to succeed.
      </DESCRIPTION>
   </HISTORY>
   <EXE NAME="AUTORUN.EXE"
       SIZE="12345"
       CHECKSUM="0xDEADBEEF"
       TIME="01/01/2001 01:01:01">
       <MATCHING_FILE NAME="..\WIN\MYMATCH.FOO" SIZE=
       "2468"
           CHECKSUM="0xBEDEBEDE"/>
       <DLL NAME="MyShim.dll">
          <EXCLUDE MODULE="FOO.DLL"/>
          <INCLUDE MODULE="BOO.DLL"/>
       </DLL>
   </EXE>
   <EXE NAME="SETUP.EXE"
       SIZE="67890"
       CHECKSUM="0xFEEDBEAD"
       TIME="02/02/2002 02:02:02">
       <PATCH NAME="MyPatch"/>
   </EXE>
</APP> {End of APP tagged entry in modification specifications 200}.
```

Figure 4:
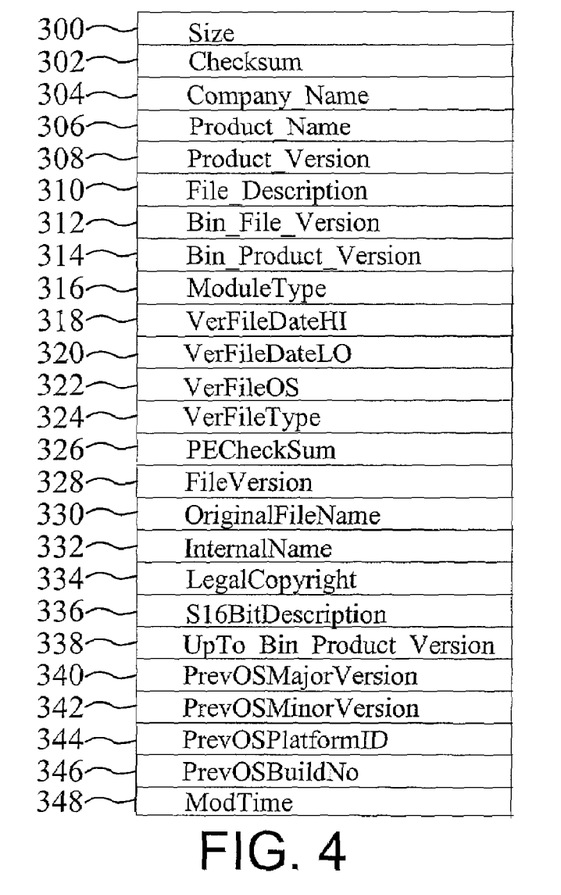
FIG. 4 is an exemplary listing of an extensible set of matching tags corresponding to the potential types of program matching data in a substitution database embodying the present invention.

Having described exemplary modification specifications 200, attention is directed to FIG. 4 that provides a list of the potential types of additional matching information specifiable within an APP or EXE tag to match a named application or executable. The list is extensible to allow designation of new types of information for distinguishing a file from other files. A creator of a particular matching specification selects a combination of types from the set of available types to uniquely identify a program. A Size type 300 specifies a size of file for a potentially matching program. A Checksum type 304 specifies a sum of all 8-byte blocks in first 4000 bytes of a program file. A Company_Name type 304 specifies a name of a company that created a file. A Product_Name type 306 specifies name of product with which the file is associated. A Product_Version type 308 identifies a product version as a string. A File_Description type 310 corresponds to a file description. A Bin_File_Version type 312 represents a file version. A Bin_Product_Version type 314 provides a particular type of product version specification in the form of 4 two-byte numbers. A ModuleType type 316 specifies a file type for code files. A VerFileDateHI type 318 specifies a most significant portion of a file creation date. A VerFileDateLO type 320 specifies a least significant portion of a file creation date. A VerFileOS type 322 specifies an operating system upon which the file was created. A VerFileType type 324 specifies a file type (applicable to all files). A PECheckSum type 326 specifies a sum of all bytes in file header (part of a portable executable file format specification). A FileVersion type 328 specifies a file version as a string. A OriginalFileName type 330 specifies an original file name for the program of interest. A InternalName type 332 specifies an internal file name for the program. A LegalCopyright type 334 specifies a copyright notice. An S16BitDescription type 336 specifies a description of the file in the event that the file can only be used in a 16-bit operating system. An UpTo_Bin_Product_Version type 338 specifies a match for "up to" a certain file version (e.g., version 4.00 and below). Thereby enabling multiple applications/dlls to be handled by a single entry in the database. A PrevOSMajorVersion type 340 specifies a previous operating system major version number (e.g., "3" for MICROSOFT WINDOWS 3.1). A PrevOSMinorVersion type 342 specifies a previous operating system minor version number (e.g., "1" for MICROSOFT WINDOWS 3.1). A PrevOSPlatformID type 344 specifies a previous operating system platform ID. A PrevOSBuildNo type 346 specifies a previous operating system build number. Finally a ModTime type 348 specifies the last time that the executable file was changed (e.g., "saved"). The following list of various potential types is exemplary and subject to individual design choices of developers of modification specifications 200 in accordance with embodiments of the present invention.

Figure 5:
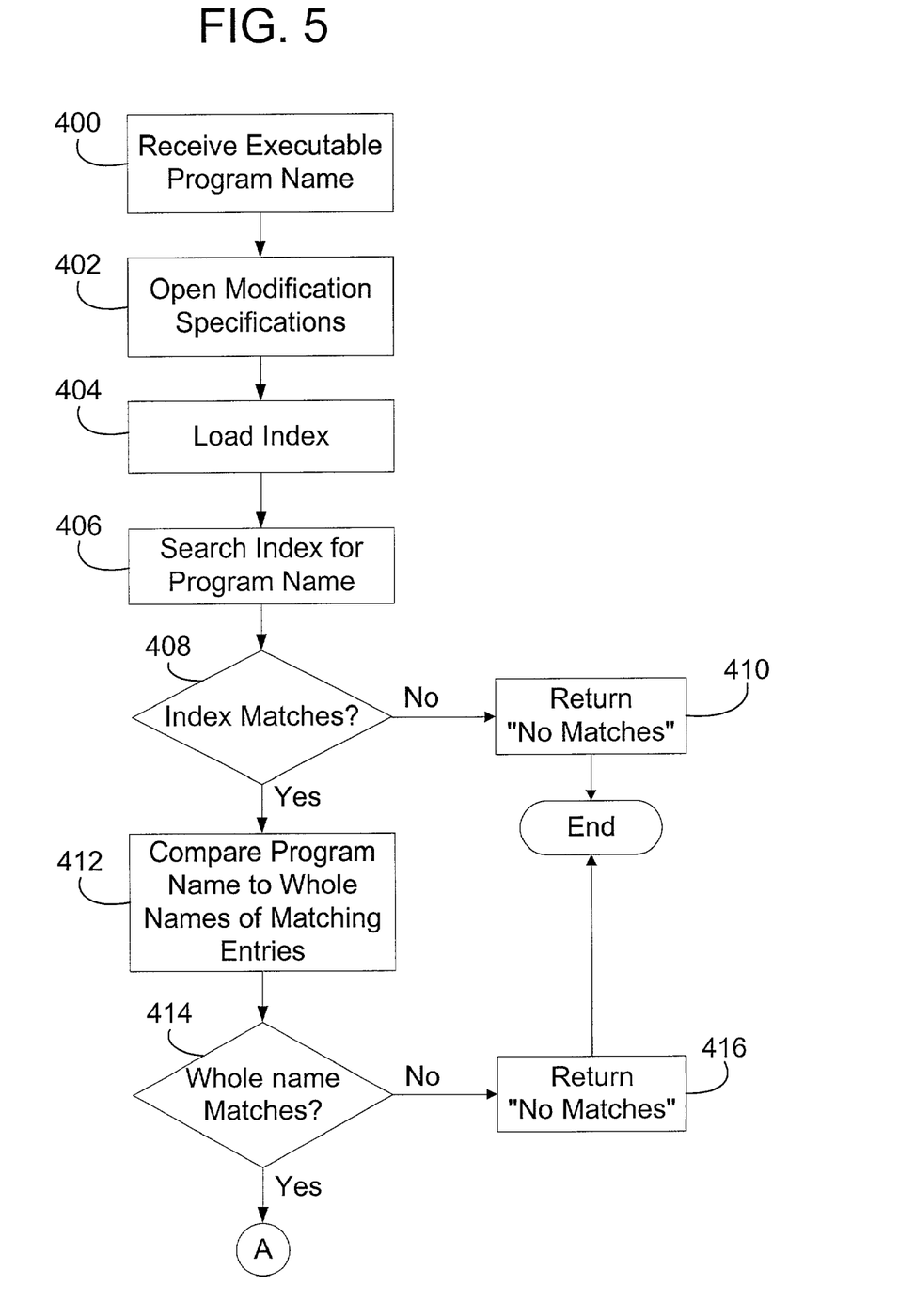
FIGS. 5 and 5a are a flowchart summarizing a set of steps performed by a matching function in accordance with an embodiment of the present invention.
Figure 5A:
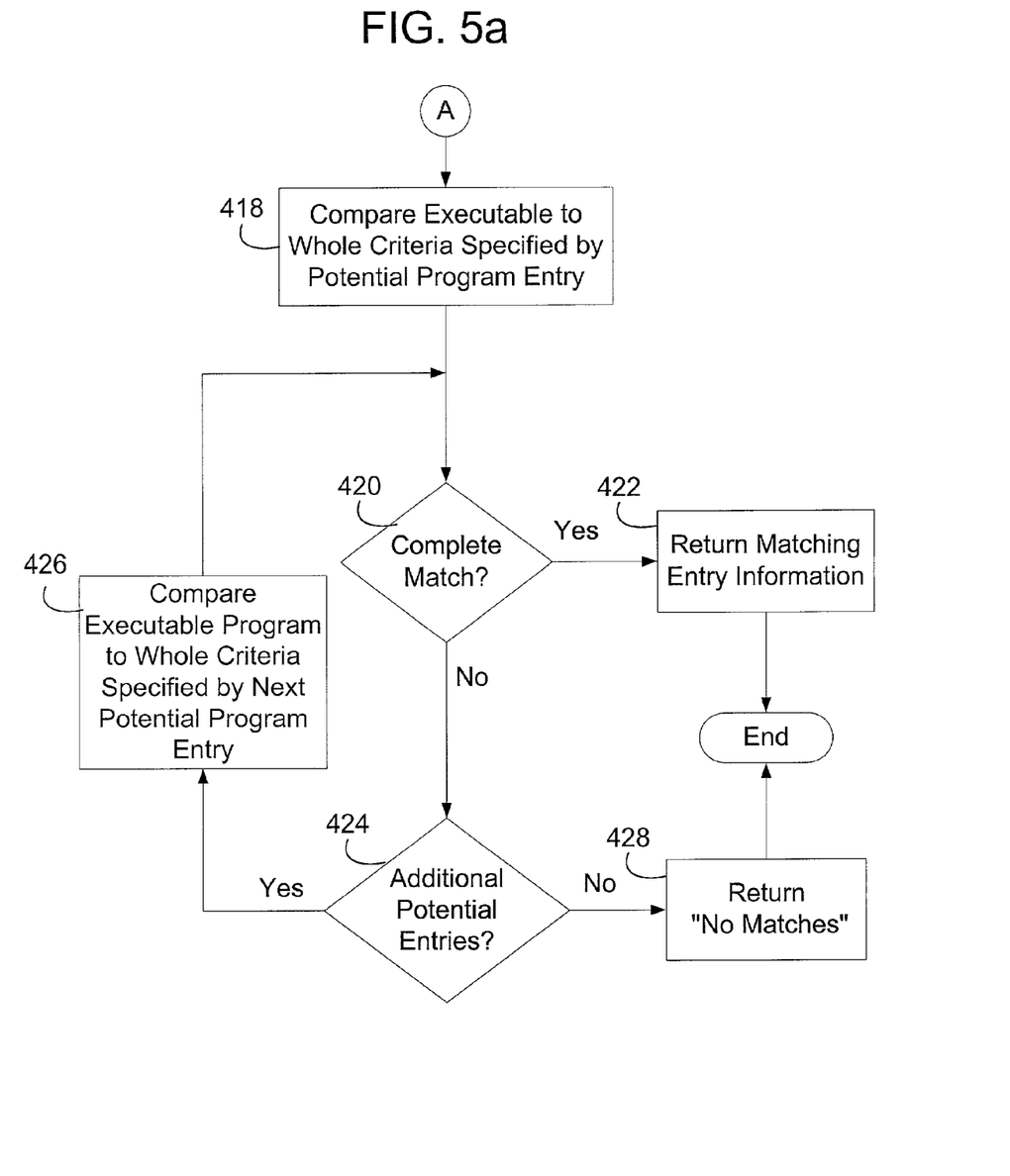

Having described an exemplary system embodying the present invention, attention is now directed to FIG. 5 that summarizes a set of steps for identifying a particular program entry within the modification specifications 200. The present invention provides a generalized program modification database comprising a collection of modifications for computer programs. The steps depicted in FIG. 5 illustratively summarize an exemplary method for identifying and providing access to the fixes for executable program. A program loader that incorporates the fixes into programs when a program is loaded for execution is described in Durr et al. U.S. patent application (serial number not yet assigned), filed Mar. 8, 2001, entitled: "A METHOD AND SYSTEM FOR DYNAMICALLY INSERTING MODIFICATIONS FOR IDENTIFIED PROGRAMS," that is explicitly incorporated herein by reference in its entirety, including any appendices and references therein. Before such a loader can apply compatibility fixes to an executable program, the loader must first identify the appropriate program entry in the modification specifications 200. There must be virtual certainty that an identified program entry indeed corresponds to the executable program that is being readied for execution. The determination of whether a corresponding program entry exists in the modification specifications 200 must complete with minimal delay—especially when a program substitution entry is not present in the modification specifications 200.

The need for virtual certainty with regard to identified program entries is addressed by the large list of potential matching data types set forth above with reference to FIG. 4. A developer need only select the types needed to ensure a unique identification criteria for a program. False positive identifications are highly unlikely in view of the large number of potential identification information types supported by the disclosed extensible program information list. The large number of available information types allows developers to tailor a program matching criteria to the most unique features of a specific program. If a developer encounters a program that requires a criterion that does not already exist in the database, the criterion is added without losing compatibility with past or future versions of the operating system.

A secondary consideration encountered by developers is to minimize the number of information types used for each particular program entry criteria and thus minimize search times. The need for fast resolution of whether substitutions are needed is further addressed by performing a multi-level disqualification search upon a read-only database specifically arranged to increase search speed that is described herein below.

Turning now to the steps depicted in FIG. 5, during step 400 the Get Match API 206 receives as input a complete path (disk location) and name of an executable program that is about to be executed by the operating system. Next, during step 402, the Get Match API 206 opens the modification specification database and checks to make sure the database is a valid database by performing consistency checks. Next, during step 404 the Get Match API 206 loads the executable program entry index 204.

Next, during step 406 the Get Match API 206 searches the index 204 for the name, or portion of the name, of the executable program provided during step 400. By way of example, the Get Match API 206 compares the first eight characters of the provided executable program name to each entry within the index 204. The index 204 typically only occupies around 10 kilobytes of memory space, and is located at the beginning of the database, and therefore it can be read in one read operation. At step 408, if no matches are found in the index 204, then control passes to step 410 wherein the Get Match API 206 returns a message to the calling process that no matches were found (i.e., this program does not have a corresponding entry in the modification specifications 200). Control then passes to the End.

If however during step 408 at least one matching index entry is located by the Get Match API 206 within the index 204, then control passes to step 412. During step 412, the Get Match API 206 completes a second tier search for potential matching executable (i.e., <EXE> tagged) entries within the modification specifications 200. During step 412 the Get Match API 206 compares the name of the executable program (provided during step 400) to whole names of programs stored within particular individual EXE tagged entries of the modification specifications 200. The particular individual EXE tagged entries correspond to the matching index entries identified by the Get Match API 206 during step 406. In an embodiment of the invention, the pages of memory storing the whole program names are located at physical memory addresses near each other in the database and are read in one operation—potentially speeding the lookup process by limiting accesses of a secondary memory device (e.g., a hard disk). A full-length string comparison is performed. The comparison in some instances provides false positives—e.g., there are many programs with the same name, like "DATABASE.EXE").

Next, during step 414, if none of the potential entries compared during step 412 rendered a whole name match, then control passes to step 416. At step 416, the Get Match API 206 returns a message to the calling process that no matches were found. Control then passes to the End.

If however during step 414 one or more whole names match the file name, then control passes to step 418. During step 418, the Get Match API 206 performs a matching operation for a first potential matching entry rendered during step 412. A criteria listed for a first potential matching entry in the database is checked against the executable program and files located in a specified directory and/or subdirectory. The matching operation is dictated by the matching criteria specified by the potential matching entry. An entry's criteria can include, but is not limited to: a file name, a file size, a file checksum, file version information, and file creation time. Only the criteria deemed necessary to establish definitively the identity of the executable program are included in a particular program entry within the database.

With reference to FIG. 3, in order to constitute a match, the executable program passed to the Get Match API 206 during step 400 must meet a particular matching criteria set forth under an <EXE> tagged entry (e.g., 252). In an embodiment of the invention, the special matching criteria is read, and the criteria is checked, starting with the information requiring the least time to acquire for purposes of comparison to a particular criterion. For example, it is very fast to check a file's size, so if the size criterion is included, it is checked first to make a fast negative determination. If any criterion does not match, then the attempt to match the entry ceases, and a negative response is registered for the potential matching program entry. Otherwise, if the criteria of an executable program entry is met, then a success is registered. When either of the two just mentioned events occurs, control then passes to step 420.

During step 420 if the executable program passed during step 400 matches the complete criteria for the first potential matching entry, then control passes to step 422, and the Get Match API accesses and provides references to substitute program segments for the particular program. In an embodiment of the present invention a code (e.g., handles or address pointers) is returned to a calling process identifying all applicable substitute program segments. In an embodiment of the present invention, there is only one appropriate matching program entry for any specified executable program (though redundant entries may exist). Thus, once a particular substitution entry is located there is no need to perform further searches. Control therefore passes from step 422 to the End. However, in an alternative embodiment of the present invention, all potential matches are checked completely. If more than one complete match is located, then a tie-breaker (e.g., newest entry) is implemented to select one of the potential entries.

If a complete match was not rendered by the first potential entry, then control passes from step 420 to step 424. If additional potential entries exist, then control passes to step 426 wherein a next potential program entry is compared to the executable program passed during step 400 to the Get Match API 206. Control then returns to step 420. If however at step 424 no additional potential entries remain, then control passes to step 428 wherein the Get Match API returns a message to the calling process that no matching entries were located. Control then passes to the End.

Illustrative embodiments of the present invention and certain variations thereof have been provided in the Figures and accompanying written description. The program modification database architecture represents a depository of program fixes and other modifications that are incorporated into previously released executable programs. A method is also disclosed for identifying a particular entry in the database corresponding to an executable program that has been selected for execution by a user. The present invention is not intended to be limited to the disclosed embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A computerized system comprising a program modification database for providing substitute program segments for particular identified programs at program load time, each identified program and each substitute program segment comprising at least one computer-executable instruction, the database comprising:

a set of substitute program segments;

a set of program entries specifying correction information for such particular identified programs, wherein individual ones of the set of program entries comprise:

a whole name matching at least one existing executable program;

a program matching criteria matching at least one existing executable program to be updated by performing a first partial name search within an index followed by a second whole name search within the set of program entries specifying correction information; and a reference to at least one substitute program segment in the set of substitute program segments; and the index including a set of identifiers, wherein each identifier identifies one of the set of program entries, and wherein each identifier comprises a name portion of the whole name.

2. The program modification database of claim 1 wherein ones of the set of identifiers comprise text strings corresponding to at least a portion of a program name.

3. The program modification database of claim 1 further comprising a preliminary search function for comparing ones of the set of identifiers to corresponding information for a program to identify potential matching entries in the set of program entries.

4. The program modification database of claim 3 wherein the corresponding information comprises at least a portion of a program name.

5. The program modification database of claim 1 wherein the set of substitute program segments includes a program interface.

6. The program modification database of claim 1 wherein individual ones of the set of program entries include a program name.

7. The program modification database of claim 6 wherein the programming matching criteria includes at least one file metadata-based criterion.

8. The program modification database of claim 1 wherein the set of potential set of criterion types for specifying a particular program matching criteria is extensible.

9. The program modification database of claim 8 wherein programming matching criterion types are specified by XML tags.

10. The program modification database of claim 1 further comprising a library section specifying one or more program files, including one or more substitute program segments, to be loaded into a process space by a program loader when the operating system loads the computer program.

11. The program modification database of claim 1 further comprising one or more explicit exclude instructions having a reference to a calling module for which program segment substitution is not implemented.

12. The program modification database of claim 11 further comprising one or more explicit include instructions having a reference to a calling module for which a more general explicit exclude instruction is overridden, thereby enabling program segment substitution for the particular calling module.

13. The program modification database of claim 1 further comprising a search function for comparing matching criteria of the individual ones of the set of program entries to a program to identify a match.

14. The program modification database of claim 13 wherein the search function comprises procedures for executing a multi-tiered executable program matching scheme to locate a matching entry within the set of program entries for a particular program, the procedures comprising:

a first procedure executing a first search on the name portion of an index having identifying information for each one of the set of program entries to identify a first set of potential matching entries;

a second procedure executing a second search on at least a portion of the first set of potential matching entries to identify a second set of potential matching entries matching the particular program based upon the whole name for the program entry; and a third procedure executing a third search on at least a portion of the second set of potential matching entries to identify a program entry matching the particular program based upon the program matching criteria for the program entry.

15. The program modification database of claim 1 wherein the set of substitute program segments is stored in a read-only memory.

16. The program modification database of claim 1 wherein the set of program entries is stored in a read-only memory.

17. The program modification database of claim 1 wherein the set of substitute program segments include substitute executable program interfaces.

18. The program modification database of claim 1 wherein the set of substitute program segments include program patches.

19. The program modification database of claim 1 wherein the set of substitute program segments are stored in a common memory location referenced by differing ones of the set of program entries.

20. Apparatus comprising the program modification database of claim 1.

21. A method for providing modification segments for a particular executable program at load time in a computer system including a program modification database having a set of program entries, wherein each program entry includes a program matching criteria and a reference to at least one substitute program segment, and wherein each executable program and each substitute program segment comprises at least one computer-executable instruction, the method comprising the steps of:

multi-tiered matching of identification information for the particular executable program to a program matching criteria for an entry within the set of program entries, the multi-tiered matching step comprising the sub-steps of:

first at program loading for execution executing a first search on a name portion of a whole name of an index having identifying information for each one of the set of program entries to identify a first set of potential matching entries;

second at program loading for execution executing a second search on at least a portion of the first set of potential matching entries to identify a second set of potential matching entries matching the particular executable program based upon a whole name for the program entry; and third at program loading for execution executing a third search on at least a portion of the second set of potential matching entries to identify a program entry matching the particular program based upon the program matching criteria for the program entry;

accessing within the entry, in response to the matching step, a sub-field identifying substitute program segments for the particular executable program; and providing memory location references for reading the identified substitute program segments based upon the accessing step.

22. The method of claim 21 wherein the index is stored as a packed data structure.

23. The method of claim 21 wherein the program matching criteria includes comparing file metadata.

24. The method of claim 21 wherein types of matching information for the program matching criteria are designated by XML tags.

25. The method of claim 21 wherein the set of potential types of matching information for the program matching criteria is extensible.

26. The method of claim 21 wherein the name portion of the index having the identifying information comprises a limited number of characters corresponding to names of programs for which entries are present in the program modification database.

27. A computer-storage medium having computer-executable instructions for providing modification segments for a particular executable program at load time in a computer system including a program modification database having a set of program entries, wherein each program entry includes a program matching criteria and a reference to at least one substitute program segment, and wherein each executable program and each substitute program segment comprises at least one computer-executable instruction, the computer-executable instructions facilitating performing the steps of:

multi-tiered matching identification information for the particular executable program to a program matching criteria for an entry within the set of program entries, the multi-tiered matching step comprising the sub-steps of:

first at program loading for execution executing a first search on a name portion of an index having identifying information for each one of the set of program entries to identify a first set of potential matching entries;

second at program loading for execution executing a second search on at least a portion of the first set of potential matching entries to identify a second set of potential matching entries matching the particular executable program based upon a whole name for the program entry; and         third at program loading for execution executing a third search on at least a portion of the second set of potential matching entries to identify a program entry matching the particular program based upon the program matching criteria for the program entry;

accessing within the entry, in response to the matching step, a sub-field identifying substitute program segments for the particular executable program; and     providing memory location references for reading the identified substitute program segments based upon the accessing step.

28. The computer-storage medium of claim 25 wherein the index is stored as a packed data structure.

29. The computer-storage medium of claim 25 wherein the program matching criteria includes comparing file metadata.

30. The computer-storage medium of claim 25 wherein types of matching information for the program matching criteria are designated by XML tags.

31. The computer-storage medium of claim 25 wherein the set of potential types of matching information for the program matching criteria is extensible.

32. Apparatus comprising the computer-storage medium of claim 27.

33. The computer-storage medium of claim 27 wherein the name portion of the index having the identifying information comprises a limited number of characters corresponding to names of programs for which entries are present in the program modification database.

\* \* \* \* \*